United States Patent [19]

Zweig

[11] Patent Number: 4,982,661
[45] Date of Patent: Jan. 8, 1991

[54] METHOD OF INFUSING CATALYTIC CROSS-LINKING AGENTS INTO LITHOGRAPHIC PRINTING INK

[76] Inventor: Leon A. Zweig, 2336 Bennett Ave., North Bellmore, N.Y. 11710

[21] Appl. No.: 425,063

[22] Filed: Oct. 23, 1989

Related U.S. Application Data

[62] Division of Ser. No. 304,594, Feb. 1, 1989, Pat. No. 4,906,296.

[51] Int. Cl.$^5$ ............................ C09D 5/20; B41F 7/24
[52] U.S. Cl. ...................................................... 101/451
[58] Field of Search ............................. 106/2, 208, 20; 101/451, 452, 450.1

[56] References Cited

U.S. PATENT DOCUMENTS

| | | | |
|---|---|---|---|
| 3,682,688 | 8/1972 | Hughes | 427/384 |
| 4,548,645 | 10/1985 | Thiebaut | 106/2 |
| 4,604,952 | 8/1986 | Daugherty | 101/451 |
| 4,659,848 | 4/1987 | Kay et al. | 556/24 |
| 4,705,568 | 11/1987 | Kay et al. | 106/26 |
| 4,764,213 | 8/1988 | Gventer et al. | 106/2 |

*Primary Examiner*—Clifford D. Crowder
*Attorney, Agent, or Firm*—Ostrolenk, Faber, Gerb & Soffen

[57] ABSTRACT

A method for introducing a catalytic agent to lithographic printing ink. The catalytic agent is formulated into a catalytic fountain solution, transported via the fountain solution to the ink and infused therein to impart desired qualities to the ink. An organic titanate compound is used as a catalytic agent in conjunction with apparatus to initiate drying for preventing ink offset and producing clean, sharp printing.

8 Claims, No Drawings

METHOD OF INFUSING CATALYTIC CROSS-LINKING AGENTS INTO LITHOGRAPHIC PRINTING INK

This is a divisional application of application Ser. No. 304,594 filed Feb. 1, 1989, now U.S. Pat. No. 4,906,296.

BACKGROUND OF THE INVENTION

The present invention relates to lithographic printing.

Lithographic printing, also known as offset printing, is a printing process wherein an image is made upon a blanket cylinder and then transferred to a substrate being printed. The inked image is made upon the blanket cylinder by a printing plate having image and non-image areas thereon. The printing plate is dampened with a fountain solution provided from a dampening system to coat the non-image areas. Ink is provided to the printing plate from an inking system, and coats the image areas of the printing plate.

With known lithographic printing processes, changes in printing press performance and printing results are effected through variation of the ink formulations. Catalytic agents are introduced directly to the ink. Printing inks have been modified in this way for various specific requirements such as adhesion, abrasion resistance, ductility, hardness, opacity, transparency, color, shading, gloss and density.

For example, U.S. Pat. No. 3,682,688 to Hughes et al. discloses adding a compound to lithographic printing ink to accelerate its drying. U.S. Pat. Nos. 4,659,848 and 4,705,568 both to Kay et al., add compounds to lithographic printing ink to promote its adhesion to plastic substrates. Varying the ink formulation to improve the inks performance, however, requires a costly specialty ink manufactured for the particular result desired. Without such an ink, the known processes are restricted to the off-the-shelf, commercially available inks.

Accordingly, it is desirable to introduce the above-mentioned catalytic agents to the ink through the fountain solution of the dampening system in order to avoid the need for a specialty ink. Fountain solution additives are known for lithographic printing. However, these additives do not impart any of the above-described qualities to the ink. Rather, they merely improve upon the basic function of the fountain solution, i.e., keeping the plate clean.

Other problems also exist in the known lithographic printing processes. At the exit of the known lithographic printing devices, either a pile of printed sheets or a roll of printed web is accumulated. If the ink is not dry it may transfer from the surface of a freshly printed sheet or web portion to the back of the sheet or web portion on top of it. This transfer of ink is known as "ink offset." Ink offset reduces the printed image quality, and stains the adjacent sheet or web portion with ink.

Presently, it is known to reduce or substantially eliminate ink offset by placing an anti-offset spray powder or a coating (which also may give improved gloss, etc.) over the printed sheet or web before its accumulation in a pile or roll. The spray powder migrates to other areas of the offset lithographic printing device. Constant maintenance is required to avoid damage to these other areas by the powder. Also, additional equipment is required to apply the powder. Similarly, anti-offset coatings require additional equipment for their application and often require additional drying equipment.

SUMMARY OF THE INVENTION

Accordingly, it is an object of the present invention to provide a new method for introducing catalytic agents to lithographic printing ink.

Another object of the invention is to eliminate ink in a printing sheet pile or web roll.

A further object of the invention is to eliminate the need for anti-offset sprays or coatings in lithographic printing.

These, and other objectives, are achieved by a process whereby a catalytic agent is introduced to a fountain solution and infused in the printing ink via the dampening system. The ink then becomes reactive to infrared radiation, ultraviolet radiation and heat. A preferred catalytic agent is an organic titanate compound. The organic titanate compound is preferably a titanate chelate.

A fountain solution is also provided for transporting and infusing the catalytic agent into the ink.

DETAILED DESCRIPTION OF THE PREFERRED EMBODIMENTS

The present invention is directed to a new process for imparting reactive qualities to lithographic printing ink by means of catalytic fountain solutions containing catalytic agents. The catalytic agents are brought into contact with the ink through the dampening system. The catalytic agents are infused into the ink and impart specific reactive qualities to the ink.

By the term "catalytic agent", is meant a substance which physically or chemically imparts reactive qualities to the ink. The catalytic agents which may be utilized in accordance with the present invention may be any type known to impart a specific property to the ink. Examples of catalytic agents are those used to achieve improved adhesion, abrasion resistance, ductility, hardness, opacity, transparency, color, shading, gloss, hardness, etc. The catalytic agent may be a mixture of such agents.

A catalytic agent, as defined above, is added to a fountain solution in an amount which will impart to the ink the desired quality. The upper limit of the amount of catalytic agent which may be used in the fountain solution will be governed by the solubility of the particular catalytic agent in the fountain solution. Other non-catalytic agents in addition to the catalytic agent may also be added to the ink via the fountain solution. For example, polyethylene (used in aqueous coatings to improve gloss) may be introduced to the ink with the catalytic agent.

The catalytic fountain solution of the present invention contains the catalytic agent therein. The catalytic fountain solution is a water-based solution formulated by combining a fountain solution concentrate, water and the catalytic agent. The solution includes gum, which may be either natural or synthetic. The gum is preferably Gum Arabic. The pH of the solution may be slightly acidic, preferably between about 3 and about 5. The pH may be adjusted by the addition of phosphoric acid. Other components, for example, glycerine, alcohol and combinations thereof, may be included in the catalytic fountain solution. In developing the catalytic fountain solution of the invention, fountain solution concentrate was obtained from QED Products of Baldwin, N.Y. This concentrate was modified by the addition of a catalytic agent, as will be discussed below.

The inks suitable for having the catalytic agent infused therein in accordance with the invention, are any of the known lithographic printing inks. An example of these inks is Beacon-Offset P.M.S. Blue ink, available from Beacon Printing Ink, Corp., 88 Winslow St., Summerville, Mass. 02144.

The catalytic fountain solution is used in a lithographic printing press in the normal manner. It is transported via the dampening system and mixes with the ink, infusing the catalytic agent therein at the point where the fountain solution and ink mix. When infused into the ink, the agent imparts to the ink the desired properties. The present invention is useful in all the known types of lithographic printing dampening systems including those that utilize non-contacting brush or spray processes, in addition to the contacting conventional ductor-type or continuous processes.

The above-described catalytic agent infusion process may be utilized to control ink offset in lithographic printing processes. In this regard, a catalytically effective amount of a crosslinking agent is used as the catalytic agent which is added to the fountain solution for infusion into the ink. Preferably, the crosslinking agent is an organic titanate compound. The ink having the organic titanate catalytic agent therein is then exposed to ultraviolet or infrared radiation to activate the compound and initiate drying of the ink. A suitable organic titanate compound is the water-soluble, titanate chelate TYZOR® 131 titanate available from Dupont Company. Other water soluble crosslinking agents may be utilized.

A suitable concentrate for a fountain solution which will eliminate ink offset may be formulated according to the following. The organic titanate compound is mixed with a balance of other ingredients in a ratio of about 3 to 1, to about 1 to 3, preferably 2 to 1. The balance of other ingredients includes one or more compounds to adjust or control the fountain solution's performance. These include gum in an amount from about 15 to 30 wt. % (preferably about 20 to about 25 wt. %), and, for example, glycerine, alcohol and phosphoric acid. Examples of the balance of other ingredients are illustrated by U.S. Pat. Nos. 2,231,045 and 2,395,654, the disclosures of which are herein incorporated by reference. About 3 to about 8 liquid ounces, preferably 6, of the resulting combination of organic titanate compound and other ingredients is then added to about one gallon of water to formulate the fountain solution. The fountain solution may then be used in the normal manner such that the fountain solution coats the non-image areas of the printing plate and contacts the ink, infusing the anti-offset organic titanate catalytic agent therein.

After the titanate chelate has been infused into the printing ink, and the ink has been applied to a substrate, the printed substrate is exposed to preferably either infrared radiation, ultraviolet radiation or a hot air knife to initiate drying of the ink. The knife may be used in combination with infrared radiation. The radiation system may include cold air blowers to reduce heat buildup in the apparatus. The printed sheet may be exposed to any suitable apparatus for a suitable amount of time to initiate the drying reaction. The particular amount of time that the ink is exposed to the radiating or blowing system will depend on the amount of radiating or blowing equipment. The printed substrate is preferably exposed to a radiation system for about one fifth of a second. The radiation or blowing system may be mounted in the lithographic press at a position which will allow it to radiate or blow on the ink and trigger the drying of the ink. For example, the radiation or blowing system may be mounted between the last printing station and the press sheet delivery.

The press may also include apparatus to cool the sheet or roll after initiation of the drying reaction by the radiation system. For example, in web printing systems, which may include some radiating equipment after some or all the printing station, a chill roll may be used to cool the web, if needed.

Radiation systems which will achieve the desired effect are available from several sources. For example, infrared and ultraviolet radiation systems are available from Graphic System Specialties, 2336 Bennett Avenue, North Bellmore, N.Y., 11710.

It is believed that the titanate chelate crosslinks with the hydroxyl groups of the ink. In this regard, additional hydroxyl groups may be provided by including additional gum, preferably Gum Arabic, in the fountain solution. Additional Gum Arabic may be included in the fountain solution in an amount to promote sufficient drying of the ink for the particular dampening system employed. Preferably, up to 10 wt. % of Gum Arabic above the usual amount present in the fountain solution (when the concentrate is purchased from a supplier such as QED Products, mentioned above) may be added to the fountain solution to provide additional hydroxyl groups.

Examples I-V below, illustrate catalytic fountain solutions and lithographic printing processes using them according to the present invention.

EXAMPLE I

On a Royal Zenith Planeta 40"×55" lithographic printing press operating at a speed of 400 feet per minute, conventional fountain solutions were replaced with solutions having 2 ounces of TYZOR® 131 titanate per 4 ounces of S3-1 fountain solution concentrate (from QED Products) per 1 gallon of water which contained 10 vol. % alcohol. The pH of the fountain solution was 4. Beacon-Offset P.M.S. Blue ink was used in the press. Polyethylene coated, carton stock was the printing substrate. Medium wave, infrared radiation apparatus operating at 90% power with an air knife was used to trigger the catalytic agent. An initial 200 test sheets where printed in accordance with the above description, using no spray powder or coating to prevent ink-offset. A balance of 1500 coated sheets were then printed with a coater turned on. The 1500 sheets were piled on top of the test sheets. The test sheets were removed from the bottom of the pile and visually inspected. The ink showed no visual signs of offset and was dry to the touch. The above test was conducted at Hub Folding Box Co., Mansfield, Mass.

EXAMPLE IA

Example I was repeated on a press equipped with an ultraviolet radiation apparatus operating at 300 watts per square inch. No offset occurred.

EXAMPLE IB

Example IA was repeated with an ultraviolet curable coating. No offset occurred.

EXAMPLE II

Example I was repeated, but the press was operated at 350 feet per minute. All sheets were printed with a water-based coating. All sheets were dry, with no offset.

EXAMPLE III

Example I was repeated, but the press was operated at 350 feet per minute, S4 fountain solution concentrate was utilized, the pH of the solution was 4.5, and the ink was Beacon Offset P.M.S. Yellow, Red and Process Blue. No offset occurred and the ink was dry to the touch.

EXAMPLE IV

On a Didde - 12" 2 color-web press (equipped with a sheeting device on its end) operating within the normal operating speed of 18,000–25,000 sheets per hour, conventional fountain solutions were replaced with solutions having 2 ounces of S4-1 fountain solution (from QED Products) per 1 gallon of water. The pH of the fountain solution was 4.5. Rubber base ink from Commercial Ink Co. was used in the press. Uncoated index card stock was the printing substrate. A short wave single lamp infrared unit and air knife was located after each printing station. The press operator was able to increase the amount of ink by 10% with the same drying ability as under ordinary operating conditions. The above test was conducted at Einson Freeman Graphics in Fairlawn, N.J.

EXAMPLE V

In a laboratory, 4 ounces of S3-3 fountain solution (from QED Products) was combined with 2 ounces of TYZOR ® 131 titanate and 1 gallon of water. The pH of the fountain solution was 3.5. Ganz Omni Black-80800 and Beacon P.M.S. Process Blue inks were rolled out onto a glass table top. The fountain solution was added to, and rolled into, the ink. The combined materials were transferred by a Brayer roller to a polyethylene coated carton stock, forming a very heavy layer of ink on the stock. The stock was then exposed to either a single lamp, 300 watt per inch ultraviolet apparatus at a belt speed of 10 feet per minute, or a single lamp, short wave infrared apparatus for an approximate exposure time of 3 seconds. The sample was dry to the touch, and when clean white blank paper was pressed against the printed surface and rubbed, no visible offsetting was detected.

In addition to the visual and touch inspections discussed above, printed sheets produced in accordance with the invention were tested by applying a swatch of scotch tape to the printed surface and pulling the tape off the printed surface in a sharp motion. No ink adhered to the tape, indicating excellent adhesion of the ink to the substrate. Additionally, the fountain solutions produced no visual effect on the color or gloss levels of the ink produced.

As illustrated by the above Examples and tests conducted in conjunction therewith, the catalytic agent infusion process of the present invention has several advantages. A greater degree of flexibility is achieved with offset lithographic printing according to the present invention since a specialty ink is not needed. The ink characteristics can be varied simply by introducing modified fountain solutions via the dampening system. Furthermore, anti-offset spray powder is not required to prevent ink offset. This reduces the equipment maintenance needed when these types of powders are employed. The present invention also eliminates the apparatus needed to apply the powder. Additionally, the need for a coating to reduce ink offset is eliminated, in addition to the apparatus for applying the coating.

Example IA demonstrates that according to the process of the present invention, complete drying of non-ultraviolet ink can be achieved with an ultraviolet radiation apparatus. Conventionally, a photo-initiator must be included in non-ultraviolet ink in order to dry it by ultraviolet radiation. However, an ultraviolet radiation apparatus will dry non-ultraviolet ink when such ink is used in combination with a catalytic fountain solution of the present invention.

Example IB demonstrates that a catalytic fountain solution may be used in combination with the known ultraviolet curable coatings which improve hardness, gloss, etc. The solution had no adverse effect on the coating, and was fully compatible with the coating.

As illustrated by Example II, a catalytic fountain solution in accordance with the invention may be used in combination with the known coatings which are used to prevent ink offset, if desired. The catalytic fountain solution and coatings were fully compatible.

A further advantage of the invention facilitates printing on surfaces upon which ink does not quickly dry. For example, polyethylene coated surfaces or plastic surfaces do not absorb the ink deposited thereon, as would paper. On these types of surfaces the ink must be dried before the substrate is accumulated in a pile or roll in order to avoid offset. According to the invention, ink printed on these types of surfaces is catalytically dried and does not offset.

While certain representative embodiments and details have been shown for the purpose of illustrating the invention, it will be apparent to those skilled in the art that various changes may be made therein without departing from the spirit or scope of the invention.

What is claimed is:

1. A process for imparting catalytic, cross-linking qualities to ink in lithographic printing processes having a dampening system with a fountain solution, comprising:
    introducing a catalytic, cross-linking agent to the fountain solution, the agent being adapted to cross-link the ink upon exposure to ultraviolet radiation, infrared radiation or hot air;
    transporting the catalytic agent to the ink via the fountain solution; and,
    infusing the catalytic agent into the ink.

2. A process as claimed in claim 1, further comprising exposing the ink to radiation or hot air after the ink has been printed on a substrate.

3. A process as claimed in claim 1, wherein the cross-linking agent is an organic titanate compound.

4. A process as claimed in claim 3, wherein the organic titanate compound is a titanate chelate.

5. In a lithographic printing process comprising the steps of dampening a printing plate with a fountain solution and inking said plate with lithographic printing ink, the improvement comprising introducing into the fountain solution a catalytic, cross-linking agent adapted to cross-link the ink upon exposure to ultraviolet radiation, infrared radiation or hot air, and infusing said catalytic, cross-linking agent into the link.

6. A process as claimed in claim 5, further comprising exposing the ink to radiation or hot air after the ink has been printed on a substance.

7. A process as claimed in claim 5, wherein the cross-linking agent is an organic titanate compound.

8. A process as claimed in claim 7, wherein the organic titanate compound is a titanate chelate.

* * * * *